United States Patent [19]

Oba et al.

[11] Patent Number: 5,241,684
[45] Date of Patent: Aug. 31, 1993

[54] DATA PROCESSOR FOR PROCESSING DATA SINGLY OR IN AN ARRAY

[75] Inventors: Toshiro Oba; Eichika Matsuda, both of Nara, Japan

[73] Assignee: Sharp Kabushiki Kaisha, Osaka, Japan

[21] Appl. No.: 925,296

[22] Filed: Aug. 6, 1992

Related U.S. Application Data

[63] Continuation of Ser. No. 343,384, Apr. 26, 1989, abandoned.

[30] Foreign Application Priority Data

Apr. 28, 1988 [JP] Japan ............... 63-106653

[51] Int. Cl.⁵ ............... G06F 3/02; G06F 3/023; G06F 7/02; G06F 9/308
[52] U.S. Cl. ............... 395/800; 364/231.5; 364/232.4; 364/232.7; 364/232.8; 364/232.93; 364/234.4; 364/237.81; 364/237.9; 364/239; 364/239.2; 364/240.9; 364/242.5; 364/245.6; 364/246.3; 364/253.1; 364/256.4; 364/270.4; 364/271.5; 364/271.9; 364/DIG. 1; 364/DIG. 2
[58] Field of Search ............... 395/800, 275, 375, 500, 395/700, 775, 325; 379/67, 76, 100, 110; 364/DIG. 1, DIG. 2

[56] References Cited

U.S. PATENT DOCUMENTS

| | | | |
|---|---|---|---|
| 3,835,260 | 9/1974 | Prescher et al. | 379/269 |
| 4,086,443 | 4/1978 | Gorham et al. | 379/100 |
| 4,175,218 | 11/1979 | Ayano et al. | 379/406 |
| 4,320,258 | 3/1982 | McDonald | 379/201 |
| 4,456,925 | 6/1984 | Skerlos et al. | 379/110 |
| 4,506,116 | 3/1985 | Genest | 379/196 |
| 4,581,484 | 4/1986 | Bendig | 379/67 |
| 4,613,730 | 9/1986 | Fechalos et al. | 379/355 |
| 4,811,383 | 3/1989 | Hoshimoto | 379/76 |
| 4,850,011 | 7/1989 | Delmege et al. | 379/157 |
| 4,860,339 | 8/1989 | D'Agosto, III et al. | 379/67 |
| 4,937,850 | 6/1990 | Borbas et al. | 379/6 |
| 5,029,197 | 7/1991 | Hashimoto | 379/67 |

Primary Examiner—Robert B. Harrell
Assistant Examiner—Daniel H. Pan

[57] ABSTRACT

Dial data inputted from a keyboard are registered in an internal memory. When the desired dial data are retrieved from the registered dial data and a dial key is pressed, the retrieved dial data are converted to corresponding dial tone signals and supplied to a speaker. Thus, the speaker outputs corresponding dial tones. At this time, a portable automatic dialing unit is acoustically coupled to the mouthpiece of a telephone set. Thus, the dial tones outputted from the speaker are again converted to the dial tone signals by the telephone set and transmitted to a telephone line, thereby driving a telephone switchboard. If the dial data include key code data "P", production of the dial tone signals is interrupted for a prescribed period. If the dial data include key code data "P-P", on the other hand, production of the dial tone signals is interrupted until the dial key is pressed again.

6 Claims, 4 Drawing Sheets

FIG. 4A  K.KOBAYASHI / OP-P0123-45-

FIG. 4B  [DIAL] KEY IN

FIG. 4C  K.KOBAYASHI / 0   OUTPUT TONE FOR "0"

FIG. 4D  K.KOBAYASHI / OP-P   STAND BY FOR DIAL KEY

FIG. 4E  [DIAL] KEY IN

FIG. 4F  { K.KOBAYASHI / 0   OUTPUT TONE FOR "0"
⋮
K.KOBAYASHI / 0123-45-6789   OUTPUT TONE FOR "9" }

FIG. 4G  K.KOBAYASHI / OP-P0123-45-

DATA PROCESSOR FOR PROCESSING DATA SINGLY OR IN AN ARRAY

This application is a continuation of application Ser. No. 07/343,384 filed on Apr. 26, 1989, now abandoned.

BACKGROUND OF THE INVENTION

1. Field of the Invention

The present invention relates to a data processor, and more particularly to a data processor such as a microcomputer system, for example, which previously stores code data for sequentially reading and processing the same.

2. Description of the Prior Art

There have generally been a number of electronic devices which store externally inputted code data in memory devices such as RAMs and thereafter sequentially read the stored data from the memory device in the stage of execution/processing to execute some processing on the basis of each code data. For example, a microcomputer system comprises a keyboard for entering key code data, which are stored in a memory device thereafter read and processed by a microcomputer. Such microcomputer systems are widely applied to devices for public welfare.

The amount of such code data depends on the number of bits thereof. Namely, n-bit code data can assume $2^n$ different states, and the amount of such data is $2^n$. For example, the amount of 4-bit code data is $2^4 = 16$.

In a conventional electronic device, such an amount of data is increased by increasing the number of bits of processed code data. However, such a method requires extension of a hardware circuit, and hence the device is complicated in structure while its cost is increased. In particular, the storage capacity of the memory is unnecessarily increased.

SUMMARY OF THE INVENTION

Accordingly, an object of the present invention is to provide a data processor which can increase the amount of data without increasing the number of bits of code data.

Briefly stated, an execution/processing device for executing a process corresponding to code data read from a memory device includes first and second execution/processing devices. The first execution/processing device executes a determined process for each one of read code data. The second execution/processing device handles a series of data as one data when an array of read code data is a predetermined one and executes another process which is different from the determined process for each one of the code data.

According to the present invention, not only each code data but an array of such code data has meaning, so that the amount of data can be increased without increasing the number of bits of the code data. Thus, there is no need to extend hardware circuit for memory capacity, whereby the amount of data can be increased while maintaining a simple and low-priced structure.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A–4G illustrate transition of the display device of the embodiment shown in FIG. 1.

DESCRIPTION OF THE PREFERRED EMBODIMENT

While the present invention is applicable to various types of electronic devices containing the aforementioned microcomputer systems, an embodiment of the present invention is now described with reference to the so-called portable automatic dialing unit.

Figure 1:
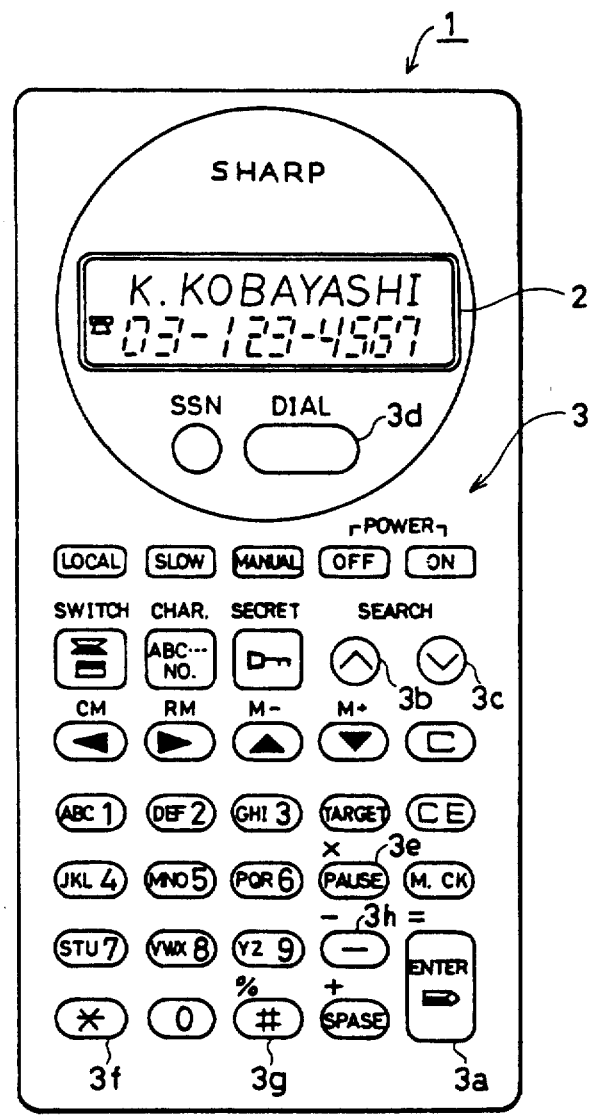
FIG. 1 is a front elevational view showing the appearance of a portable automatic dialing unit according to an embodiment of the present invention.

FIG. 1 is a front elevational view showing the appearance of a portable automatic dialing unit according to an embodiment of the present invention. As shown in FIG. 1, this portable automatic dialing unit 1 is provided with a display 2 and a key manipulation part 3 including a plurality of types of keys employed for inputting, outputting and retrieving data.

Figure 2:
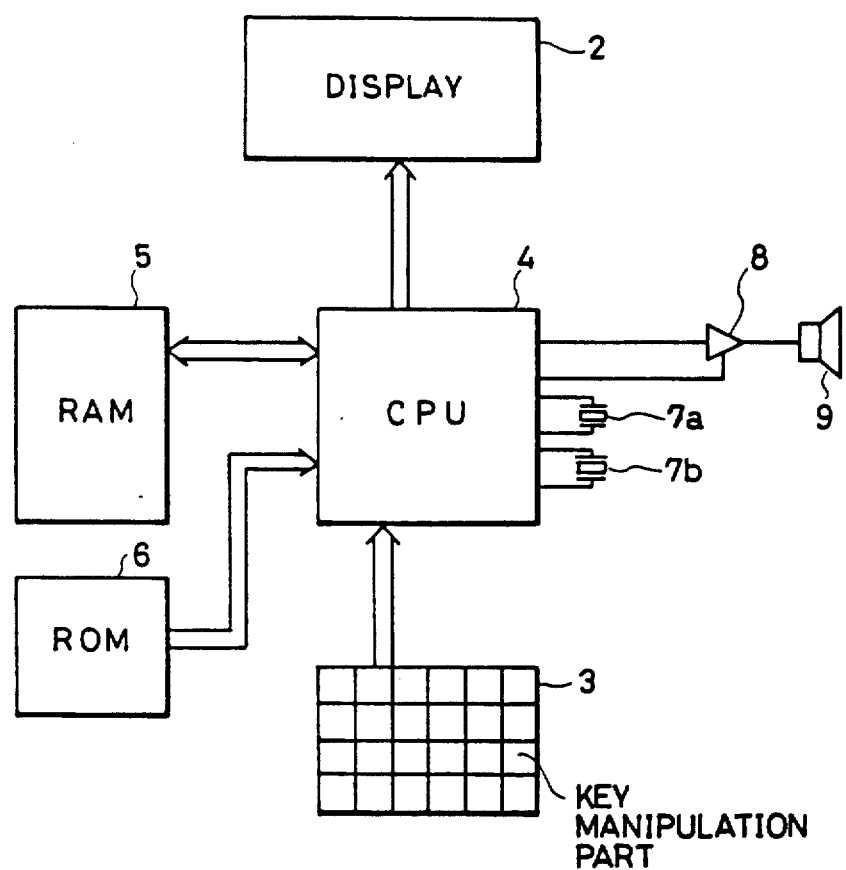
FIG. 2 is a schematic block diagram showing the structure of the embodiment shown in FIG. 1.

FIG. 2 is a schematic block diagram showing the electrical circuit of the embodiment shown in FIG. 1. Referring to FIG. 2, a CPU 4 is connected with the aforementioned display 2 and key manipulation part 3. The CPU 4 is further connected with a RAM 5 and a ROM 6. The RAM 5 is adapted to store data inputted through the key manipulation part 3 and various other data required for processing. The ROM 6 is adapted to store an operation program for the CPU 4, such as that shown in FIG. 3, as described below. The CPU 4 is further connected with a oscillator 7a for generating operation clocks for the CPU 4 and a oscillator 7b employed for producing dial signals which are transmitted to a telephone line. The dial signals are audio frequency signals having the same frequencies as the signals transmitted on a telephone line through a pushbutton operation of a pushbutton dialing telephone set. The dial signals produced on the basis of the oscillator 7b are amplified by an amplifier 8 and then supplied to a speaker 9. The speaker 9 is provided within the portable automatic dialing unit 1 to be opposed to its rear surface. A plurality of holes (not shown) are provided in the rear surface of the portable automatic dialing unit 1, in order to facilitate transmission of dial tones from the speaker 9.

With reference to the aforementioned structure, a method of using the portable automatic dialing unit 1 according to this embodiment is briefly described. First, the user inputs a personal name and a telephone number through the key manipulation part 3 and thereafter presses an input key 3a so that the inputted data (the name and the telephone number) are registered in the RAM 5. The user repeats such manipulation to register a plurality of personal names and a plurality of telephone numbers in the RAM 5. In order to make a telephone call, the user manipulates call keys 3b and 3c so that the registered data are sequentially called from the RAM 5 and displayed on the display 2. Thus, a target name and telephone number are retrieved. Then the user presses a dial key 3d, so that the CPU 4 produces dial tone signals corresponding to the telephone number appearing on the display 2 and supplies the same to the speaker 9 through the amplifier 8. Thus, the speaker 9 outputs dial tones corresponding to the target telephone number. At this time, the mouthpiece of a telephone receiver is in close contact with the rear surface of the portable automatic dialing unit 1, to receive the dial tones derived from the speaker 9. Therefore, the dial tones outputted from the speaker 9 are again converted to the dial signals by the telephone receiver, and transmitted on a telephone line. The dial signals thus transmitted to the telephone line, which are audio frequency signals having the same frequencies as pushbutton signals of a pushbutton dialing telephone set, drive a telephone switchboard to connect the telephone line to another telephone set having the telephone number corresponding to the signals.

When telephone lines are commonly applied to a larger number of telephone sets in a company, for example, a distributor is provided to selectively connect each telephone set with an outside line. In order to make a telephone call to the outside in such case, it is necessary to dial a prescribed identification number such as "0" before dialing a telephone number to drive the distributor, thereby connecting the telephone set with an outside line. In this case, a certain degree of stand-by time must be provided between the transmissions of the identification number "0" and the transmission of the telephone number. Namely, it is necessary to wait until the distributor connects the telephone set with the outside line after transmission of the identification number "0", since the telephone number, cannot be delivered to an outside line if the telephone number is transmitted before such connection so made. In order to cope with this, a pause key 3e is provided in the manipulation part 3 according to this embodiment. When a key code data "P" based on the pause key 3e is registered between the head identification number "0" and the target telephone number, the unit 1 automatically enters a stand-by state for one second after the transmission of "0". Since the time required for such connection to the telephone line upon transmission of the identification number "0" is generally predictable, a prescribed number of the key code data "P" may be registered with margins to some extent. After a lapse of a stand-by time corresponding to the number of registered key code data "P", the target telephone number is automatically transmitted. However, when the telephone line is in an inferior state or a response from an operator is inserted before the connection to the telephone line, it is impossible to predict the time required for the connection to the telephone line upon transmission of the head identification number "0". In this case, therefore, the user must confirm that the telephone set is connected to the telephone line before transmitting the target telephone number. Thus, a stand-by state upon transmission of "0" is automatically terminated after a lapse of a prescribed time, or the user first confirms that the telephone set is connected to the telephone line and then terminates the stand-by state through a key manipulation. According to this embodiment, the stand-by state is automatically terminated when one or more key code data "P" are registered in succession, while the stand-by state is terminated upon confirmation of line connection when key code data "P-P" are registered, as described below. In other words, the meaning of each key code data is neglected and another predetermined processing is executed when prescribed key code data are registered in predetermined order.

Figure 3:
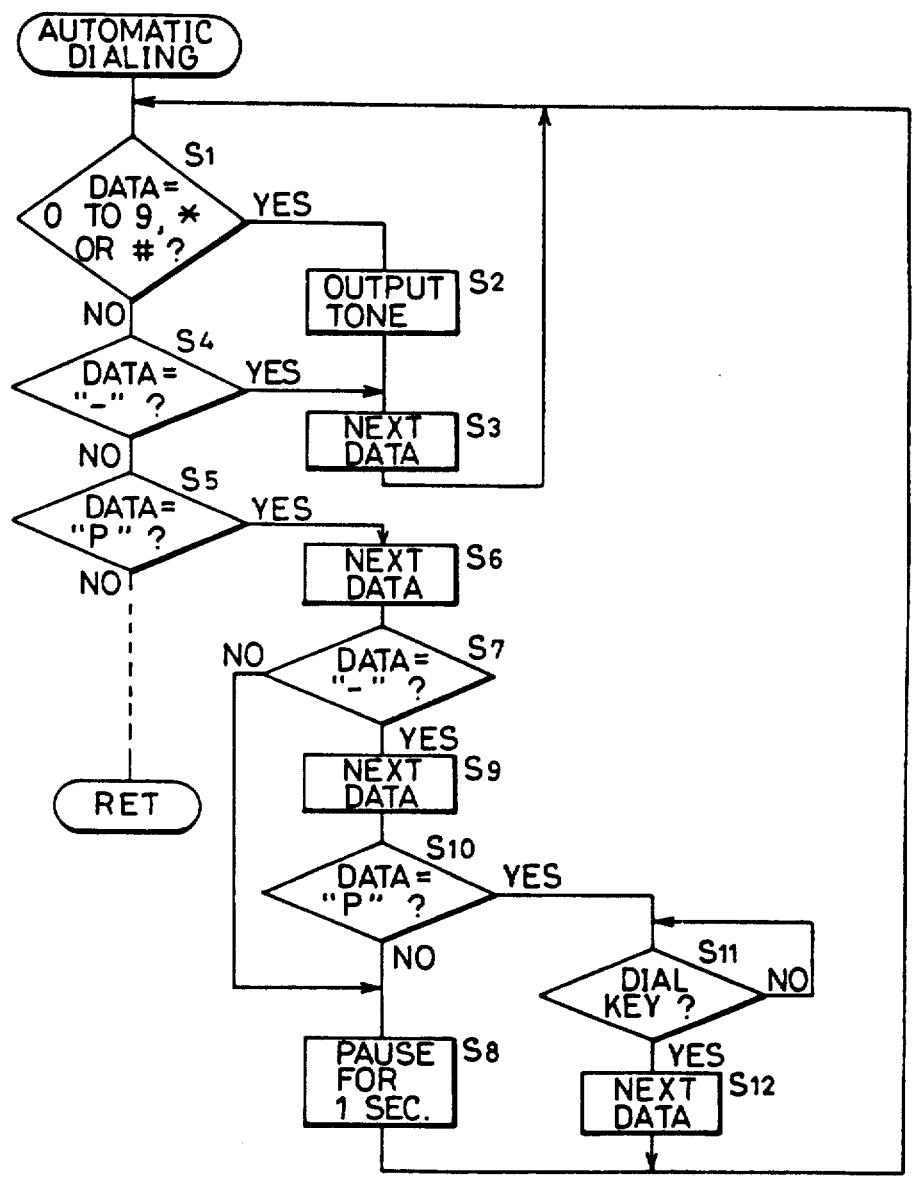
FIG. 3 is a flow chart for illustrating the operation of the embodiment shown in FIG. 1.

With reference to a flow chart shown in FIG. 3, the operation of this embodiment is now described in detail. When a corresponding target telephone number is retrieved and displayed on the display 2 through manipulation of the call keys 3b and 3c, the dial key 3d is pressed so that the unit enters the operating state shown in FIG. 3. At this time, the retrieved telephone number is processed by the CPU 4. Assuming that a telephone call is made from a company to the outside as described above, the presence of a head identification number "0" is determined at a step S1. At a step S2, the CPU 4 produces a dial signal corresponding to the head identification number and outputs the same to the speaker 9. Thus, the speaker 9 outputs a dial tone corresponding to the identification number "0" as sound which is inputted to the telephone set, thereby driving a distributor (not shown). Then, the next data in the register is obtained at a step S3. If "P" is the next registered data as the key code data, a decision is made at the step S1 that the key code data is none of "0" to "9", "*" and "#". The symbols "*" and "#" are registered by keys 3f and 3g shown in FIG. 1 respectively and employed for various telephone service, in order to play back the content recorded in an automatic answering telephone set provided in the user's own house, for example. Then the process is advanced to step S4, at which a decision is made that the registered key code data is "-". This key code data "-" is registered by a key 3h in the key manipulation part 3 to indicate that no particular process is to be performed. The key code data "-" is mainly inserted between codes of a telephone number to promote easy understanding of the same, as shown in FIG. 1, for example. Thereafter the process is advanced to a step S5 to determine whether the registered key code data is "P". If step S5 makes an affirmative decision, the process is advanced to a step S6 to obtain the next registration data. If the next registration data is not "-", a decision of no is made at step S7 and the unit enters a stand-by state for one second at a step S8. Thereafter the process is returned to the step S1. If a plurality of the key code data "P" are registered in succession, the unit enters a stand-by state at the step S8 again through steps S1, S4, S5, S6 and S7. Upon termination of the stand-by state corresponding to the number of registered key code data "P", the first digit of the target telephone number is determined at step S1 and a dial signal corresponding to the first digit is outputted to the speaker 9 at step S2. Then, the next digit is obtained step S3 and the process is returned to the step S1. Thus, the target telephone number is automatically transmitted in closed-loop processing through the steps S1 to S3. In other words, dial tones outputted from the speaker 9 as sound are inputted in the telephone set and transmitted on the telephone line. Consequently, a telephone switchboard is driven to connect the telephone line to another telephone set corresponding to the target telephone number. If the "-" data is registered between the codes of the telephone number, no operation of the step S2 is performed but next data is referred to at the step S3 via the step S4.

Description is now made on operation performed when the key code data "P-P" are registered between the head identification number "0" indicating that the telephone call is made from the company to the outside and the target telephone number. In this case, the dial tone signal corresponding to the head identification number "0" is outputted through the steps S1 to S3, and the key code data "P" is decided at the step S5 so that the next data is obtained at step S6. Since the data "-" is currently obtained a decision of yes is made at step S7, and the next data is obtained at step S9. Since the data "P" is obtained at this time, a decision of yes is made at step S10 and the process is advanced to a step S11. At step S11, a decision is made as to whether or not the dial key 3d has been pressed. If the decision is of no, a stand-by state is maintained. When the user presses the dial key 3d after confirming that the telephone set is connected to the telephone line, the process is advanced to step S12, to obtain the next data. The next data is the target telephone number, and hence corresponding dial signals are outputted through the aforementioned steps S1 to S4. Thus, when the key code data are registered in the order of "P-P", no operation is performed in response to a stand-by command for one second as the case when the key code data is "P", but a stand-by process is maintained until manipulation of a dial key 3d is executed. Namely, in this embodiment, not only does each independent key code data have meaning but on array of such key code data has meaning. Thus, the types of data provided in the key code data of determined bit numbers can be further extended.

FIGS. 4A-4G show transition of a display state appearing on the display when the key code data are registered in the order of "P-P", for example.

FIG. 4A shows the target telephone number as retrieved. FIG. 4B shows the execution of the dial key to start the process illustrated in FIG. 3. FIG. 4C illustrates the display and output after the execution of steps S1 and S2 of FIG. 3 for the target telephone number. FIG. 4D illustrates the display after the execution of steps S1, S4, S5, S6, S7, S9, S10 and S11 of FIG. 3 for the target telephone number. FIG. 4E illustrates the execution of the dial key when an outside line is obtained at step S11 of FIG. 3. FIG. 4F illustrates the display and output of the actual dialing of the target telephone number through the execution of steps S1, S2, S3, and S4 of FIG. 3, FIG. 4G illustrates the display at the completion of dialing the target telephone number.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable automatic telephone dialer, comprising:
   first means for inputting sets of data;
   second means for storing the inputted sets of data;
   third means for selecting a single set of stored data;
   fourth means for inputting a first dial command and a second dial command, non-simultaneously;
   fifth means, in response to said fourth means and said first dial command, for determining if a first code in the selected set of data corresponds to a telephone character;
   sixth means, in response to said fifth means, for producing tones representing the telephone characters in the selected set of data when said fifth means determines that the code corresponds to a telephone character;
   seventh means, in response to said fifth means, for determining if a first code of the selected set of data corresponds to a predetermined delay when said fifth means determines that the code does not correspond to a telephonic character;
   eighth means for determining if a first code of the selected set of data corresponds to a predetermined delay function when said seventh means determines that the code corresponds to a predetermined delay;
   ninth means, in response to said eighth means, for producing a predetermined delay when said eighth means determines that the first code of the selected set of data does not correspond to the predetermined delay function; and
   tenth means, in response to said eighth means, for suspending operations of the dialer until said second dial command is inputted when said eighth means determines that the first code of the selected set of data corresponds to the predetermined delay function;
   said fifth means, in response to said ninth means, determining if a next code in the selected set of data corresponds to a telephonic character;
   said tenth means, in response to said second dial command, enabling said fifth means to determine if a next code in the selected set of data corresponds to a telephonic character.

2. The dialer as claimed in claim 1, wherein said first and fourth means are portions of a keyboard including a plurality of keys.

3. The dialer as claimed in claim 2, wherein said keyboard includes keys for inputting telephonic characters and personal identification data relating thereto such that a set of data includes at least telephonic characters and personal identification data.

4. The dialer as claimed in claim 3, further comprising:
   eleventh means for displaying the stored personal identification data;
   said third means enabling a user to select a single set of data from the personal identification data being displayed by said eleventh means.

5. The dialer as claimed in claim 1, wherein said sixth means includes a speaker for outputting said tone audibly to a telephone receiver.

6. A method for automatic dialling of a telephone from a portable module, comprising the steps of:
   (a) inputting sets of data;
   (b) storing the inputted sets of data;
   (c) selecting a single set of stored data;
   (d) inputting a first dial command and a second dial command at different times;
   (e) determining if a first code in the selected set of data corresponds to a telephonic character when the first dial command is inputted;
   (f) producing tones representing the telephonic characters in the selected set of data when said step (e) determines that the first code corresponds to a telephonic character;
   (g) determining if a first code of the selected set of data corresponds to a predetermined delay when said step (e) determines that the first code does not correspond to a telephonic character;
   (h) determining if a first code of the selected set of data corresponds to a predetermined delay function when said step (g) determines that the first code does correspond to a predetermined delay;
   (i) producing a predetermined delay when said step (g) determines the first code of the selected set of data corresponds to the predetermined delay;
   (j) suspending operations of the dialer until the second dial command is inputted when said step (h) determines that the first code corresponds to the predetermined delay function; and
   (k) determining if a next code in the selected set of data corresponds to a telephonic character after the execution of steps (f), (i), or (j).

* * * * *